(12) United States Patent
Chen

(10) Patent No.: US 7,164,842 B2
(45) Date of Patent: Jan. 16, 2007

(54) BACKLIGHTING DEVICE

(75) Inventor: Shu-Sheng Chen, Taipei Hsien (TW)

(73) Assignee: Taiwan Nano Electro-Optical Technology Co., Ltd. (TW)

( * ) Notice: Subject to any disclaimer, the term of this patent is extended or adjusted under 35 U.S.C. 154(b) by 266 days.

(21) Appl. No.: 10/869,117

(22) Filed: Jun. 15, 2004

(65) Prior Publication Data

(51) Int. Cl.
*G02B 6/10* (2006.01)
(52) U.S. Cl. .................. 385/147; 385/901; 362/26; 362/62; 362/64; 362/65; 362/330; 362/339
(58) Field of Classification Search ............... 385/901, 385/147
See application file for complete search history.

(56) References Cited

U.S. PATENT DOCUMENTS

| | | | | |
|---|---|---|---|---|
| 5,050,946 A | * | 9/1991 | Hathaway et al. | 385/901 |
| 5,390,276 A | * | 2/1995 | Tai et al. | 385/146 |
| 5,432,876 A | * | 7/1995 | Appeldorn et al. | 385/901 |
| 5,528,720 A | * | 6/1996 | Winston et al. | 385/146 |
| 5,718,497 A | * | 2/1998 | Yokoyama et al. | 362/625 |
| 6,104,371 A | * | 8/2000 | Wang et al. | 385/901 |
| 6,330,386 B1 | * | 12/2001 | Wagner et al. | 385/901 |
| 6,485,157 B1 | * | 11/2002 | Ohkawa | 362/625 |
| 6,491,411 B1 | * | 12/2002 | Itoh | 362/246 |
| 6,561,663 B1 | * | 5/2003 | Adachi et al. | 385/901 |
| 6,595,652 B1 | * | 7/2003 | Oda et al. | 362/609 |
| 6,768,525 B1 | * | 7/2004 | Paolini et al. | 385/901 |
| 2005/0129357 A1 | * | 6/2005 | Yang et al. | 385/901 |

* cited by examiner

*Primary Examiner*—Frank G. Font
*Assistant Examiner*—James P. Hughes
(74) *Attorney, Agent, or Firm*—Ostrolenk, Faber, Gerb & Soffen, LLP

(57) ABSTRACT

A backlighting device includes a light guide plate having a first side and a second side opposite to the first side, and a point light source to generate light incident on the first side of the light guide plate. The light guide plate has a plurality of longitudinal diffraction microstructures which are arranged and oriented according to the location of the point light source. The microstructures are varied gradually at least in size, position, density, or shape relative to the location of the point light source. When light is incident on the light guide plate from the point light source, the microstructures, which are varied gradually at least in size, position, density, or shape, function to regulate and adjust the illuminance of bright and dark areas in the light guide plate so as to provide uniform brightness.

8 Claims, 6 Drawing Sheets

… …

BACKLIGHTING DEVICE

BACKGROUND OF THE INVENTION

1. Field of the Invention

The invention relates to a backlighting device, more particularly to a backlighting device capable of providing uniform brightness.

2. Description of the Related Art

The display panels used in mobile phones, PDAs, digital cameras, and the like normally operate in conjunction with a backlighting source. Generally, light is radiated from a plurality of point light sources, such as light emitting diodes, is incident on a light guide plate, and is then reflected from the light guide plate to the display panel. Referring to FIG. 1, the light emitted from the light emitting diodes 11 is seldom uniformly incident on the light guide plate 12. In other words, the light from the light emitting diodes 11 is incident on the light guide plate 12 in a manner that the illuminance is decreased gradually away from a location of the light guide plate 12 where the light is incident along a direction transverse to the light incident direction. Relatively bright areas 13 and relatively dark areas 14 are hence formed on the light guide plate 12, which will in turn form gray areas on the display panel. Therefore, the aforesaid light guide plate 12 is modified in the art by treating the light guide panel 12 with dotting or sand-blasting to form microstructures 15, which are distributed in a manner of varying density, depth or size. However, in order to obtain an optimum effect for a specific light guide plate 12, it is required to perform a series of tests before producing the light guide plate 12. Therefore, it is not easy to mass-produce the light guide plate 12. Furthermore, the light guide plate 12 having a uniform brightness effect can hardly be obtained in the aforesaid method.

SUMMARY OF THE INVENTION

Therefore, it is an object of the present invention to provide a backlighting device capable of overcoming the aforesaid disadvantages of the prior art.

In the first aspect of this invention, the backlighting device according to this invention includes a light guide plate having a first side and a second side opposite to the first side, and a point light source to generate light incident on the first side of the light guide plate. The light guide plate has a plurality of longitudinal diffraction microstructures which are arranged and oriented according to the location of the point light source. The microstructures are varied gradually at least in size, position, density, or shape relative to the location of the point light source. When light is incident on the light guide plate from the point light source, the microstructures, which are varied gradually at least in size, position, density, or shape, function to regulate and adjust the illuminance of bright and dark areas in the light guide plate so as to provide uniform brightness.

In the second aspect of this invention, the backlighting device according to this invention includes a light guide plate having a first side and a second side opposite to the first side, and a point light source disposed adjacent to the first side to generate light incident on the first side. The light guide plate further has a surface extending between the first and second sides, and a plurality of diffraction microstructures formed in the surface. The surface has a first illuminating region, and two second illuminating regions on two sides of the first illuminating region. The light enters the light guide plate in the first illuminating region. The microstructures are varied gradually at least in size, position, density, or shape from the first illuminating region toward the second illuminating regions. When light is incident on the light guide plate from the point light source, the microstructures function to regulate and adjust the illuminance of bright and dark areas in the light guide plate so as to provide uniform brightness.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
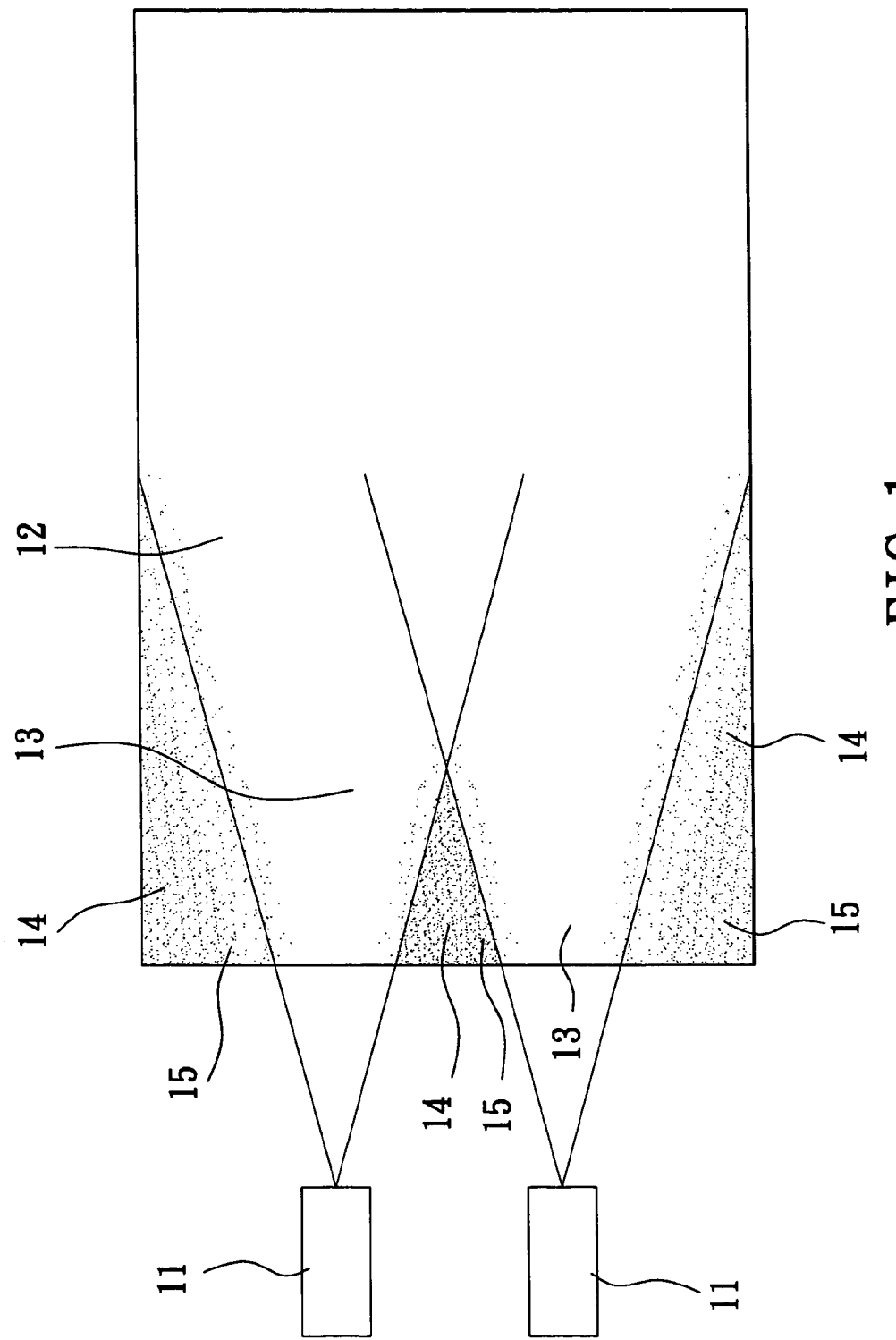
FIG. 1 is a schematic view of a conventional backlighting device.
Figure 2:
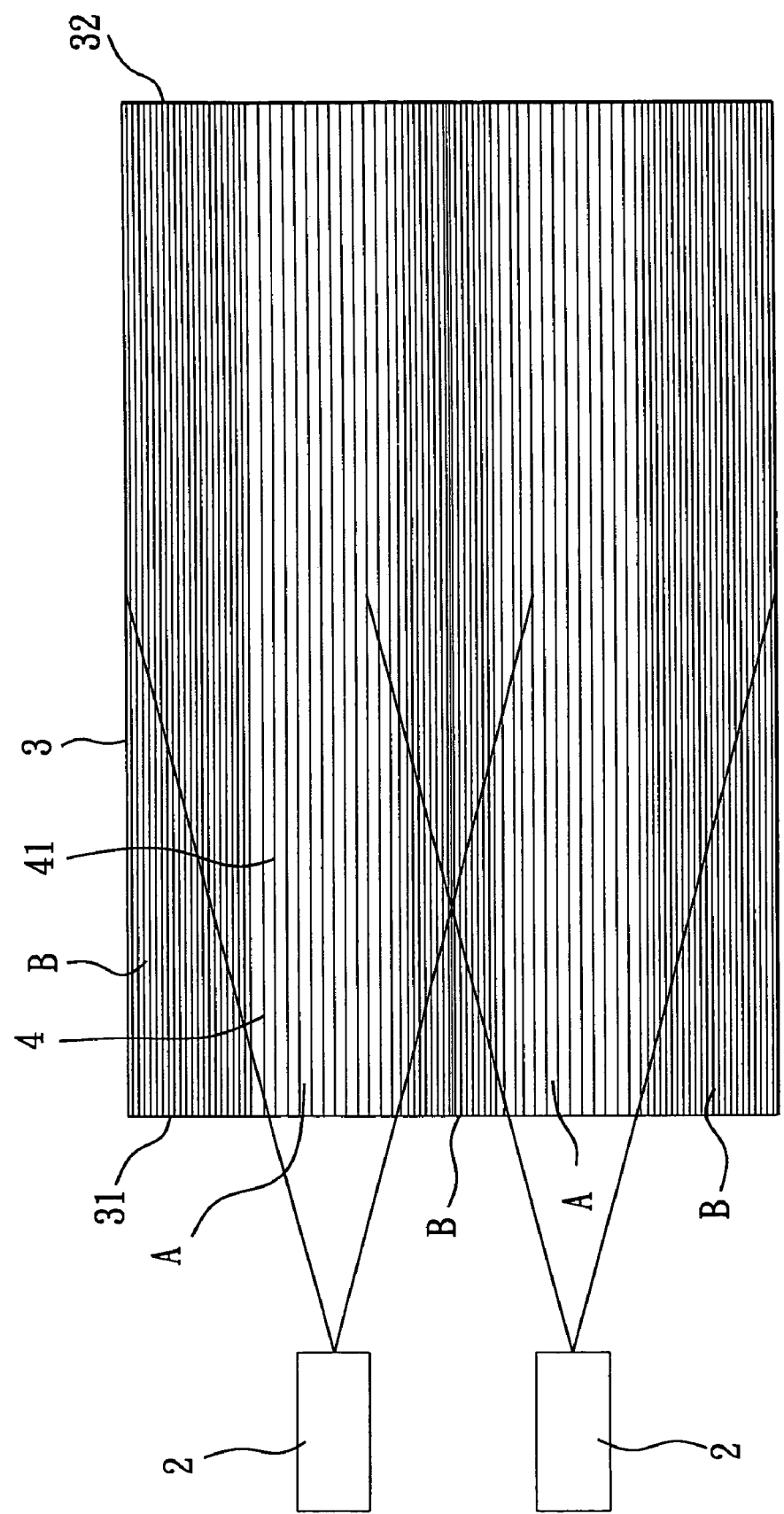
FIG. 2 is a schematic view of the first preferred embodiment of a backlighting device according to this invention.

Referring to FIG. 2, the first preferred embodiment of a backlighting device according to this invention is shown to include a light guide plate 3 and a plurality of point light sources 2. The light guide plate 3 has a first side 31 and a second side 32 opposite to the first side 31. The point light sources 2 are disposed adjacent to the first side 31 at intervals to generate light incident on the first side 31 of the light guide plate 3. In practice, light emitting diodes are used as the point light sources 2, the number thereof depending on the size of a display panel (not shown) The light guide plate 3 has a surface 31 extending between the first and second sides 31,32, and a plurality of longitudinal diffraction microstructures 4 extending from the first side 31 to the second side 32 on the surface 31. The light guide plate 3 further includes a plurality of first illuminating regions (A) each of which extends to the second side 32 from a location of the first side 31 where the light is incident, and a plurality of second illuminating regions (B) each of which is provided between two adjacent ones of the first illuminating regions (A). The second illuminating regions (B) are generally darker than the first illuminating regions (A) adjacent to the first side 31 of the light guide plate 3.

Referring to FIGS. 2, 3A, 3B, 4A, and 4B, the microstructures 4 are arranged and oriented according to the location of the point light sources 2. The microstructures 4 are varied gradually at least in size, position, density, or shape relatively to the location of the point light sources 2. Therefore, when light is incident on the light guide plate 3 from the point light sources 2, the microstructures 4, which are varied gradually at least in size, position, density, or shape in a direction transverse to a longitudinal direction of the microstructures 4 from each of the first illuminating regions (A) towards an adjacent one of the second illuminating regions (B), function to regulate and adjust the illuminance of bright and dark areas in the light guide plate 3 so as to provide uniform brightness.

Figure 3A:
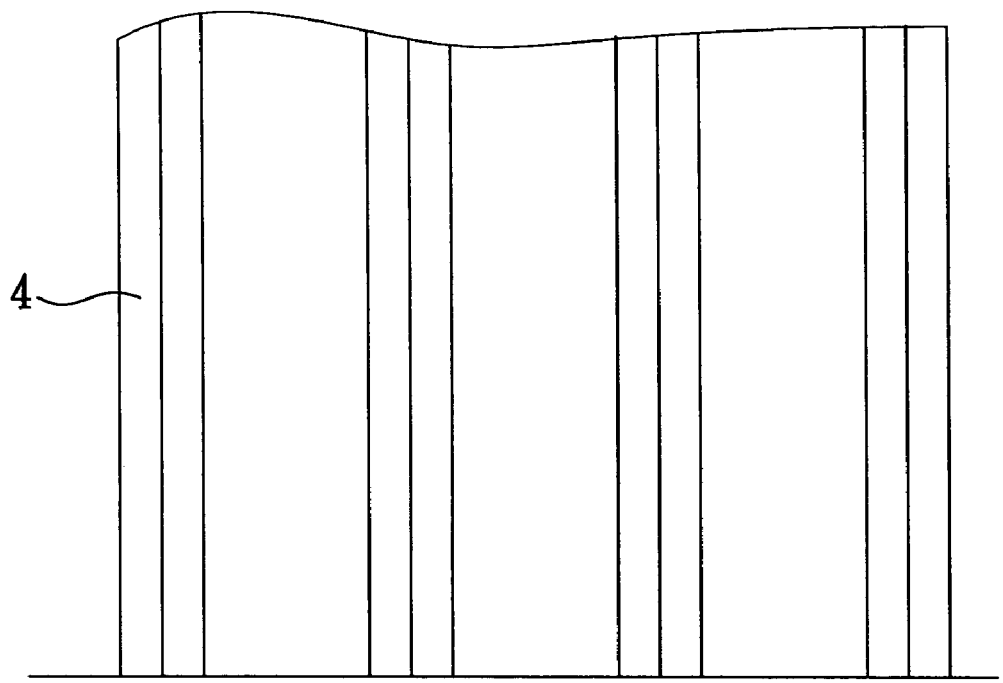
FIG. 3A is a fragmentary schematic view of an area (A) of a light guide plate of the first preferred embodiment of FIG. 2.
Figure 3B:
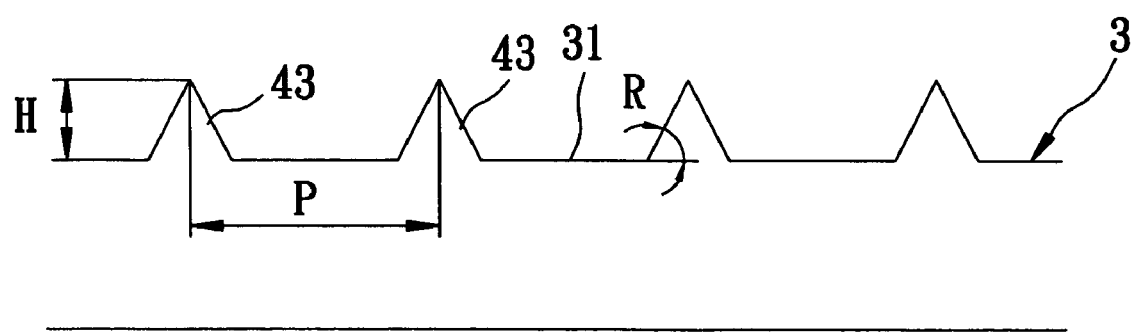
FIG. 3B is a schematic view of the light guide plate of FIG. 3A.
Figure 4A:
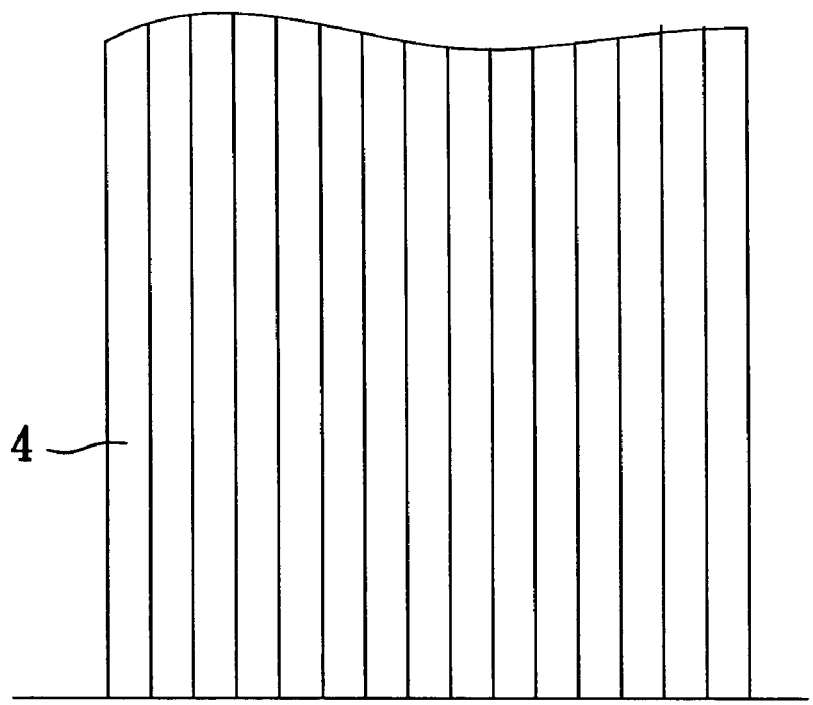
FIG. 4A is a fragmentary schematic view of an area (B) of the light guide plate of the first preferred embodiment of FIG. 2.
Figure 4B:
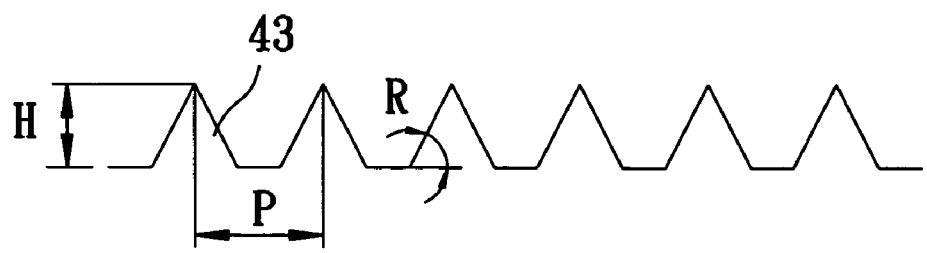
FIG. 4B is a schematic view of the light guide plate of FIG. 4A.
Figure 5:
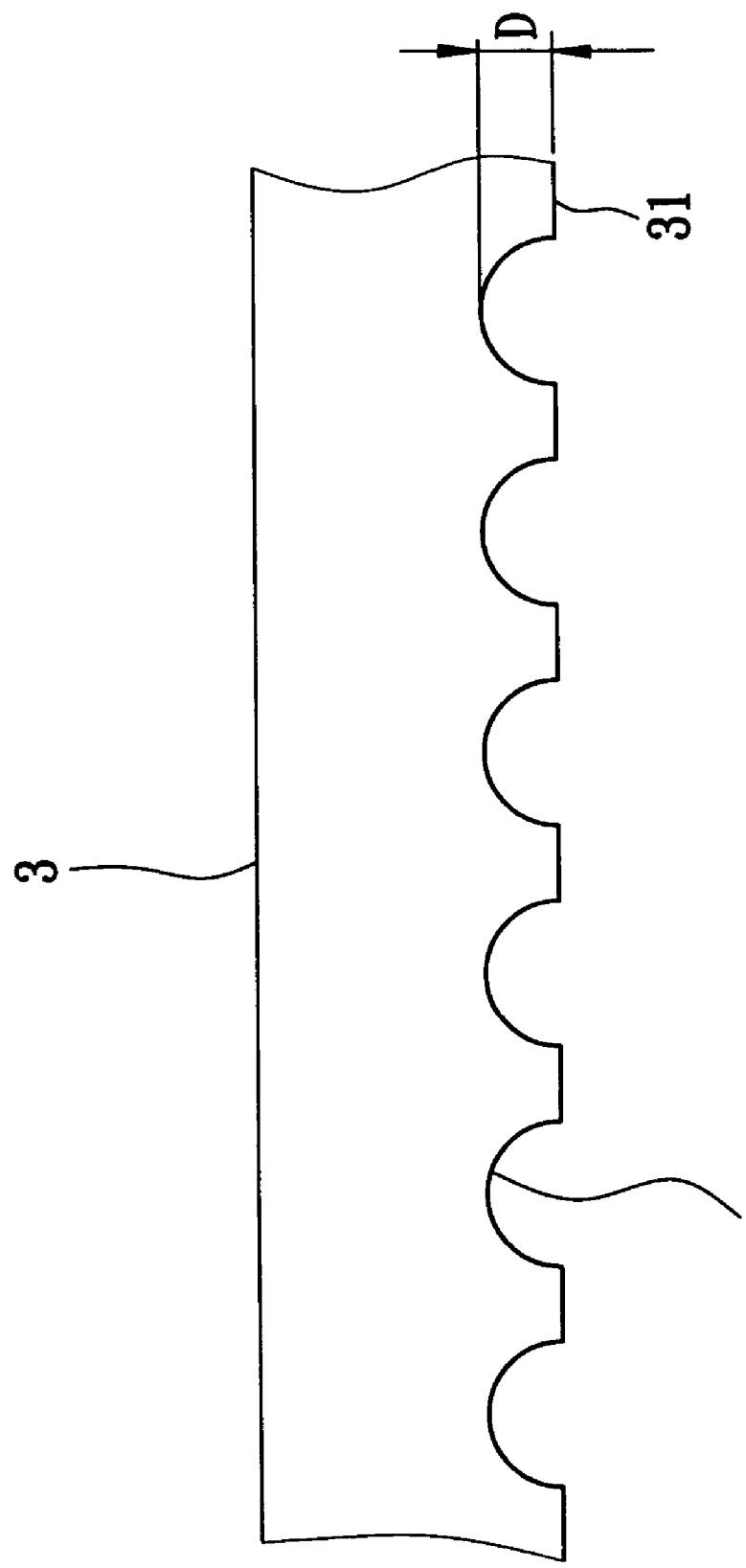
FIG. 5 is a fragmentary schematic view of a light guide plate of the second preferred embodiment of a backlighting device according to this invention.
Figure 6:
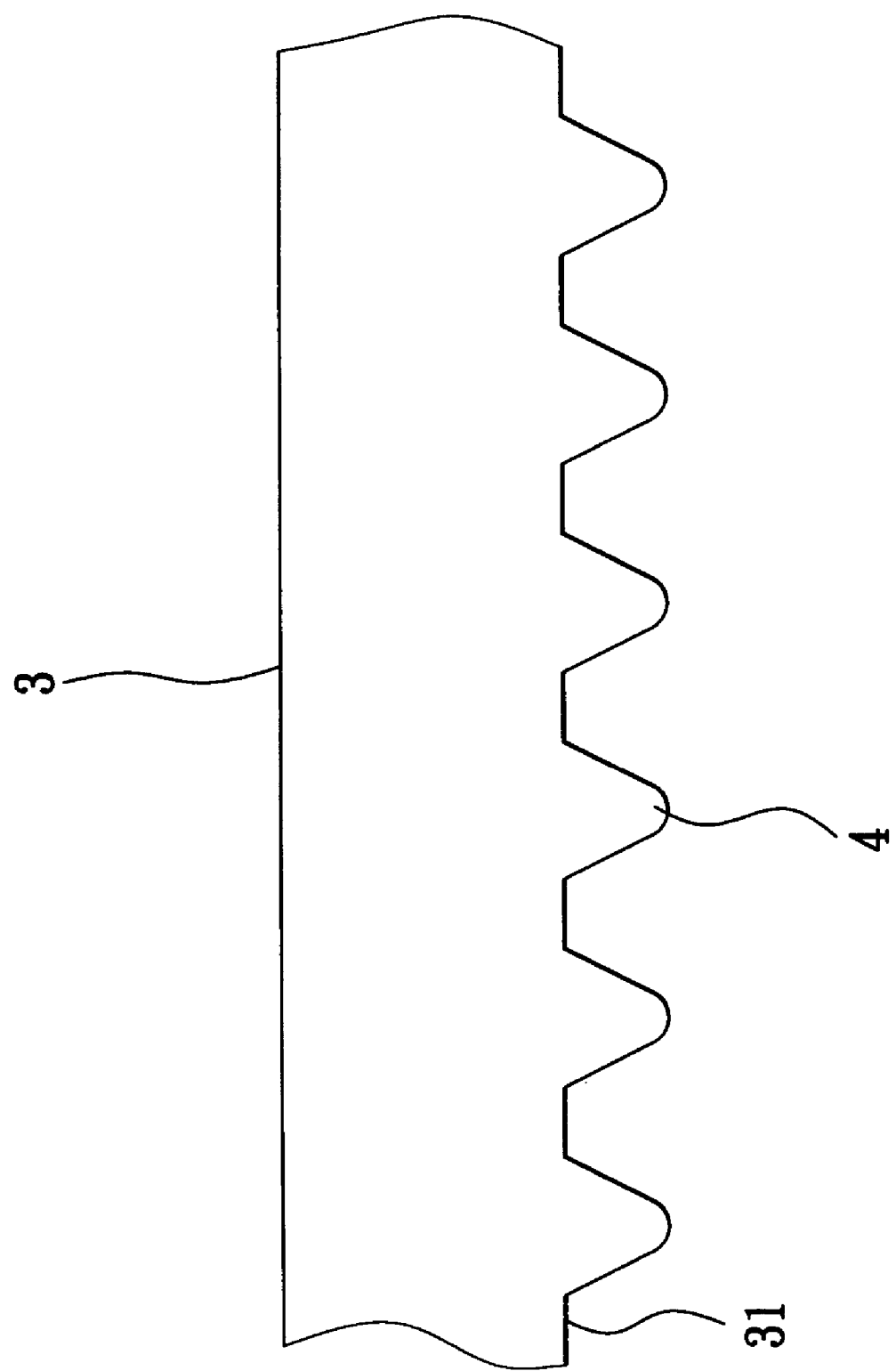
FIG. 6 is a fragmentary schematic view of a light guide plate of the third preferred embodiment of a backlighting device according to this invention.

Referring to FIGS. 3B, 4B, and 6, in the preferred embodiment of this invention, the longitudinal diffraction microstructures 4 are formed as ridges that project from the surface 31 of the light guide plate 3 and that are tapered outward from the surface 31. Alternatively, referring to FIG. 5, the longitudinal diffraction microstructures 4 can be formed as grooves that are formed in the surface 31 of the light guide plate 3 and that are tapered inward from the surface 31. The longitudinal diffraction microstructures 4 can be provided on at least one of the top and bottom surfaces 31 of the light guide plate 3.

Referring to FIGS. 2, 3B, 4B, and 5, the microstructures 4 extend from the first side 31 to the second side 32 in a direction along which the light is incident on the light guide plate 3. Each of the microstructures 4 has a height (H) or depth (D) from the surface 31, and an inclined face 43 which is inclined with respect to the surface 31 by an angle (R). The microstructures 4 are spaced apart from each other by a distance (P). The microstructures 4 are distributed with a density which changes gradually from each of the first illuminating regions (A) to an adjacent one of the second illuminating regions (B) (i.e., towards two sides from a light entrance region of the light guide plate 3 as a center). The density is varied gradually by controlling the height (H) or depth (D), the angle (R), or the distance (P).

When the angle (R) of the inclined faces 43 of the ridges is chosen as a parameter to be varied to achieve uniform brightness for the light guide plate 3, the height (H) or depth (D) and the distance (P) are kept constant, and the angle (R) of the microstructure 4 is increased gradually from each of the first illuminating regions (A) to an adjacent one of the second illuminating regions (B). When the distance (P) between the microstructures 4 is chosen as the parameter to be varied to achieve uniform brightness for the light guide plate 3, the height (H) or depth (D) and the angle (R) are kept constant, and the distance (P) is decreased gradually from each of the first illuminating regions (A) to an adjacent one of the second illuminating regions (B). When the height (H) of the ridges is chosen as the parameter to be varied to achieve uniform brightness for the light guide plate 3, the angle (R) and the distance (P) are kept constant, and the height (H) of the ridges is increased from each of the first illuminating regions (A) to an adjacent one of the second illuminating regions (B). Similarly, when the depth (D) of the grooves is chosen as the parameter to be varied to achieve uniform brightness for the light guide plate 3, the angle (R) and the distance (P) are kept constant, and the depth (D) of the grooves is increased from each of the first illuminating regions (A) to an adjacent one of the second illuminating regions (B).

In practice, the aforesaid variations- can be simulated by using a computer to compare the illuminance between the first and second illuminating regions (A,B) before manufacturing the light guide plate 3.

In view of the aforesaid, since the optimum configuration of the light guide plate 3 can be obtained by computer simulation, the backlighting device of this invention can overcome the aforesaid shortcomings of the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A backlighting device, comprising:
a light guide plate having a first side, a second side opposite to said first side, and a surface extending between said first and second sides; and
a point light source to generate light incident on said first side of said light guide plate;
said light guide plate having a plurality of longitudinal diffraction microstructures formed on said surface of said light guide plate, and arranged and oriented according to a location of said point light source; said longitudinal diffraction microstructures being formed as ridges or grooves that are tapered away from said surface, and said microstructures, are varied gradually at least in size, position, density, or shape;
wherein said microstructures extend in a direction along which said light is incident on said light guide plate, each of said microstructures having a height or depth from said surface, and an inclined face which is inclined with respect to said surface by an angle, said microstructures being spaced apart from each other by a distance, said microstructures being distributed with a density which changes gradually towards two sides from a light entrance region of said light guide plate as a center, said density being varied gradually by controlling said height or depth, said angle, or said distance so that when light is incident on said light guide plate from said point light source, said microstructures regulate and adjust the illuminance of bright and dark areas in said light guide plate so as to provide uniform brightness.

2. The backlighting device as claimed in claim 1, wherein said angle of said microstructures is increased gradually towards said two sides from said light entrance region of said light guide plate when said height or depth and said distance are kept constant.

3. The backlighting device as claimed in claim 1, wherein said distance of said microstructures is decreased gradually towards said two sides from said light entrance region of said light guide plate when said height or depth and said angle are kept constant.

4. The backlighting device as claimed in claim 1, wherein said height or depth of said microstructures is increased gradually towards said two sides from said light entrance region of said light guide plate as a center when said angle and said distance are kept constant.

5. A backlighting device comprising:
a light guide plate having a first side and a second side opposite to said first side; and
a point light source disposed adjacent to said first side to generate light incident on said first side;
said light guide plate has a surface extending between said first and second sides, and a plurality of diffraction microstructures formed in said surface, said surface having a first illuminating region, and two second illuminating regions on two sides of said first illuminating region, said light entering said light guide plate in said first illuminating region;
said first and second illuminating regions extend from said first side to said second side of said light guide plate;

said microstructures are longitudinal and extend from said first side to said second side, said microstructures including ridges or grooves formed in said surface and tapered away from said surface; said microstructures are varied gradually at least in size, position, density, or shape from said first illuminating region toward said second illuminating regions;

whereby, when light is incident on said light guide plate from said point light source, said microstructures function to regulate and adjust the illuminance of bright and dark areas in said light guide plate so as to provide uniform brightness;

wherein each of said microstructures has a height or depth from said surface, and an inclined face which is inclined with respect to said surface by an angle, said microstructures being spaced apart from each other by a distance, at least one of said height or depth, said angle and said distance of said microstructures being varied gradually from said first illuminating region towards said second illuminating regions.

6. The backlighting device as claimed in claim 5, wherein said angle of said microstructures is increased gradually from said first illuminating region towards said second illuminating regions when said height or depth and said distance are kept constant.

7. The backlighting device as claimed in claim 5, wherein said distance of said microstructures is decreased gradually from said first illuminating region towards said second illuminating regions when said height or depth and said angle are kept constant.

8. The backlighting device as claimed in claim 5, wherein said height or depth of said microstructures is increased gradually from said first illuminating region towards said second illuminating regions when said angle and said distance are kept constant.

* * * * *